Figure 1:
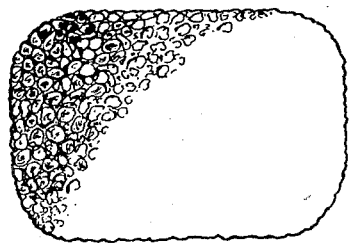

May 31, 1927.

W. O. SNELLING

SPONGE RUBBER

Filed Jan. 18, 1926

1,630,721

INVENTOR

Walter O. Snelling.

Patented May 31, 1927.

1,630,721

UNITED STATES PATENT OFFICE.

WALTER O. SNELLING, OF ALLENTOWN, PENNSYLVANIA.

SPONGE RUBBER.

Application filed January 18, 1926. Serial No. 82,159.

My invention relates to the preparation of rubber goods of highly porous nature suitable for use as artificial sponges and for many other purposes where rubber in a very light, porous and elastic condition is desired. By my invention articles of sponge rubber may be prepared more cheaply than by methods at present known, and wastage of rubber may be avoided by the direct molding of articles of sponge rubber of any desired shape without the use of special molds capable of withstanding high pressure.

I have discovered that when a dispersion of rubber in an aqueous medium, such as rubber latex containing from two to twenty per cent of rubber, for example, is subjected to a temperature lower than the freezing point of the fluid forming the continuous phase of the system, the crystals of water which form are substantially free from rubber, and form an interlacing network. The freezing of the water permits of the coagulation of the rubber latex, which is left in the form of a highly porous sponge, and by vulcanizing this sponge in its distended condition I obtain vulcanized sponge rubber superior to the sponge rubber produced by the vaporizing or gasifying processes at present known.

One point of particular advantage of my present invention over the methods of making sponge rubber known up to this time is the extent to which the porosity and structure of the resulting sponge rubber can be controlled by appropriate modifications of the conditions existing during the freezing step. Rubber latex of high dilution gives a sponge rubber of very low density, and by forming ice crystals very slowly in dilute latex, sponge rubber of very low density and very large pore spaces may be prepared, while by using similarly dilute rubber latex, but forming the ice crystals quickly, and particularly if the free growth of the crystals is hindered, as by jarring or agitating the latex during the freezing period, sponge rubber of low density but having very fine pores may be obtained. Conversely concentrated latex of high rubber content gives sponge rubber of relatively high density, the pore spaces being in general small, and the fineness may be controlled by the conditions under which the ice crystals are permitted to form. In general, sponge rubber made by my invention is characterized by possessing openings which are bounded by plane surfaces, as distinguished from the round or oblong openings which are characteristic of sponge rubber made by the evolution of gas within a mass of rubber. The openings in sponge rubber made by my present invention have the shape of the ice crystals which I form in the freezing step, and do not have the bubble shape which characterizes sponge rubber or foam rubber made by gas evolution processes.

This application is in part a continuation of, and is in part a substitute for, my co-pending application S. N. 18,643, filed March 26, 1925.

Figure 2:
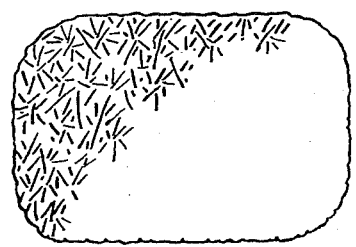
Figure 3:
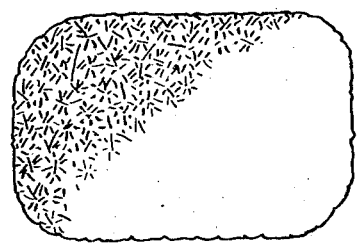
Figure 4:
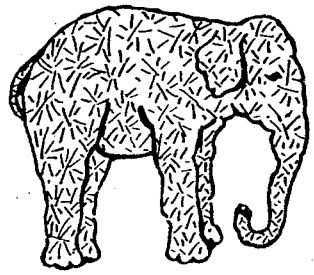

In the accompanying drawings, Figure 1 represents a rubber sponge made by the gas evolution process now commonly employed in the manufacture of sponge rubber. Figure 2 represents a rubber sponge made by my present process, when the period of cooling is such as to cause the formation of ice crystals of medium size. Figure 3 represents a rubber sponge made by my present invention, when agitation is employed to cause the formation of very small ice crystals. Figure 4 represents a toy made of sponge rubber, by the treatment of rubber latex in accordance with my present invention, the latex being held in a mold of suitable shape during the freezing step.

As an example of my present invention, I will describe a method which I may employ in preparing a very soft, elastic and porous mass of sponge rubber from ordinary rubber latex. The latex is adjusted to a desired rubber content, which in the present example will be taken as 10%, and is then exposed to a temperature of —20° C. until solidly frozen. If relatively coarse openings are desired in the finished sponge rubber, the latex is left undisturbed during the freezing period, but if relatively fine openings are desired in the finished rubber sponge, the latex is jarred or stirred during the formation of the first ice crystals.

After the rubber latex is completely frozen, the solid mass is removed from the mold or vessel in which the freezing step was conducted, and is exposed to a stream of air while the temperature is maintained below the freezing point of the mass, a temperature of —10° C. to —5° C. being suitable. As ice has a very considerable vapor pressure at this temperature, the ice crystals slowly evaporate, and the evaporation is hastened by the carrying away of the vapor by the stream of cold air directed against the object. As the ice crystals evaporate or volatilize, the rubber, being non-volatile, remains behind in the form taken by the rubber as a result of the formation of the ice crystals, and when the evaporation of the water is complete, the rubber is left in the form of a coagulated but unvulcanized spongy mass.

When all of the water has been evaporated or volatilized, the mass of unvulcanized sponge rubber is dipped for a few seconds in a 3% solution of sulfur chloride in carbon bisulfide or other solvent, in the usual manner employed in cold vulcanization. The spongy mass of rubber permits the ready penetration of the vulcanizing solution, and upon now permitting the solvent employed to evaporate, the rubber sponge is left in highly porous and properly vulcanized condition.

As will be noted from the example just given, the essential steps involve the freezing of a suspension of rubber to form ice crystals therein and the coagulation of the rubber in the form which it takes as a result of the formation of the ice crystals. Instead of using rubber latex, I may, however use an artificial suspension of rubber in an aqueous medium, such as has been prepared in recent years by the dispersion of caoutchouc in a suitable aqueous medium, and instead of using natural or artificial rubber latex in which the particles of rubber are unvulcanized, I may employ a latex dispersion of vulcanized rubber such as may be prepared by known processes. Instead of depending wholly upon the formation of ice crystals from the fluid forming the continuous phase of my rubber dispersion I may cool rubber latex to the freezing point of the contained water, and I may then add snow, ice crystals, crushed ice or the like to the mass, the ice crystals, snow crystals or ice particles being subsequently evaporated at a temperature below their freezing point by the general method already described. Instead of ice, I may employ any other suitable material to serve a similar function, and in one modification of my invention I replace ice by a material having a high vapor pressure, such as camphor, naphthalene, or dichlorbenzene, as a substitute for ice crystals or ice particles.

As the evaporation of ice is greatly facilitated by the use of reduced pressure I may materially hasten the otherwise somewhat slow process of evaporating my ice crystals below their melting temperature, by subjecting a frozen mass of rubber dispersion to reduced pressure, and I have found a pressure corresponding to 5 millimeters of mercury to give excellent results. At this low pressure the evaporation of the ice tends to keep the temperature below the freezing point of the remaining ice crystals or ice particles, and accordingly when such low pressures are maintained temperature control is quite easy, the ice crystals by their own evaporation tending to maintain the temperature below the freezing point of the ice being evaporated.

In a modified form of my present invention, I freeze an aqueous suspension of rubber latex or other dispersion of rubber in an aqueous medium, and I then coagulate the resulting rubber network or sponge by exposure to a coagulating substance, while the ice crystals are still in their frozen condition. I may, for example, immerse a mass of frozen rubber latex in a 1% solution of hydrochloric acid cooled to the temperature at which ice crystals begin to form in the dilute acid, or I may suspend a mass of frozen rubber latex in a vessel containing the dilute vapors of hydrochloric, acetic, formic or other volatile acid, the effect of acid substances being to coagulate the rubber in the frozen mass in the form in which the rubber exists after the ice crystals form during the freezing operation. I may combine my coagulating and my vulcanizing steps, by exposing a frozen dispersion of rubber to the vapors of sulfur chloride, in this case the sulfur chloride serving to both coagulate the rubber and to vulcanize the coagulated material.

As will be noted from the above, my invention may be modified in many ways, and the texture of the resulting rubber sponge may be controlled in many ways to produce desired results. The rubber content of the rubber suspension may be modified by such means as the addition of water to concentrated rubber latex, or the concentration of dilute rubber latex, and I have obtained sponge rubber products from rubber latex having a very wide range of rubber content. Although I prefer to use a dispersion of rubber containing not less than 2% of rubber, and containing not more than 40% of rubber, I have obtained sponge rubber products containing less than the minimum rubber content named, and other products containing more than the maximum rubber content named, and in practice I find that I can modify the rubber content of my rubber dispersion over a very wide range while still obtaining sponge rubber of satisfactory nature. It will of course be evident that instead of adding water to concentrated rubber latex to dilute same, a preferable method is to cool the latex to slightly below 0° C., and to then add snow, ice crystals or finely crushed ice, as this forms one means of controllably modifying both the texture and the rubber content of the finished rubber sponge. The texture of the finished rubber sponge, for any given rubber content, may be controlled by any of the well known means for modifying the crystal growth of the ice crystals within the rubber suspension. Slow cooling, without agitation, leads to the formation of relatively large ice crystals, and rapid cooling and agitation or jarring leads to the formation of small crystals. By stirring a dispersion of rubber in an aqueous fluid while maintaining the temperature below the freezing point until crystals begin to form, but discontinuing the stirring when the fluid becomes semi-solid or slushy from the formation of ice crystals, sponge rubber of very good texture may be obtained.

One of the features of my invention which distinguishes it from earlier methods of the formation of sponge rubber is the exceptionally wide measure of control which is possible over the apparent specific gravity, density or rubber content and the texture of the resulting rubber sponge. I may, for example, make rubber sponge of a desired apparent specific gravity or volume of pore space, with the pores either small, medium, or large, as may be desired, or I may make rubber sponge which will contain a desired percentage of very small or fine openings, a desired percentage of medium openings, and a desired percentage of large or coarse openings. I may prepare several sponges of the same size and weight, but different in texture, or I may prepare sponges in which both the apparent specific gravity and the texture modified, and by combining several of the possible measures of control in a single operation (as by controlling for example the rubber content of the latex, the time of stirring during the freezing step, and the amount and size of the particles of ice added in solid form to the partially frozen latex), I may modify the characteristics of my resulting product over an exceptionally wide range. Even the measures of control already outlined do not wholly exhaust the possibilities of controllably modifying the texture of my sponge rubber, as I may, for example, prepare an unvulcanized rubber sponge of very low density (as by employing very dilute latex, or by "loading" cooled latex with a large amount of crushed ice or snow crystals) and after removing the ice by any of the methods described, I may compress this very porous sponge prior to its vulcanization, thus obtaining a still further modified form of product.

It will also of course be evident that the coagulability of my dispersion of rubber may be influenced by such factors as the amount of ammonia present in the latex, and also such factors as the amount of sugar, gums, or other neutral bodies present, and suitable amounts of such substances may be added if desirable, a low concentration of ammonia facilitating coagulation of the latex, and a high concentration of ammonia tending to reduce coagulation, and also reducing the freezing point of the aqueous continuous phase. Sugar, gums and like neutral water-soluble bodies tend to reduce the freezing point of the rubber dispersion, and also tend toward the production of smaller crystals in the freezing step than would otherwise be formed.

One feature that distinguishes the product made in accordance with my invention from all forms of sponge rubber made by earlier processes, is the shape of the openings or pores. In general, the openings in ordinary sponge rubber are bubble shaped, and are formed by the evolution of gas, but in the product made in accordance with my present invention the openings have either the shape of ice crystals, or the shape of the particles of crushed ice or like material added to the latex, and are pseudomorphs of same. In the commonest form of my invention, the openings are pseudomorphs of ice crystals, and form an interlacing or connected network through the spongy material, and a greater degree of interconnection between pore spaces than exists in other forms of sponge rubber is commonly found in the product made in accordance with my present invention.

It will of course be evident that as the vulcanization of my products is an operation entirely separate and distinct from the preparation of the material in porous or sponge form, I have in my vulcanizing step still another method of control, and I may vulcanize either incompletely, where partial vulcanization is sufficient for the purpose for which the porous rubber product is to be used, or more completely, where firmer and less elastic products are desired. I may employ as my vulcanizing agent sulfur chloride dissolved in a solvent, or I may employ sulfur chloride in vaporous form. In one form of my invention I add preciptated sulfur or sulfur in any other suitably finely divided form to my original rubber dispersion, and I vulcanize my soft rubber sponge after the removal of the ice crystals or particles, by heating to a vulcanizing temperature. In still another form of my invention I expose my unvulcanized rubber sponge alternately to gaseous sulfur dioxide and hydrogen sulfide, following a well known method of procedure in which nascent sulfur formed by reaction between the sulfur dioxide and the hydrogen sulfide is apparently the active vulcanizing agent. It will of course be evident that I may make use of any suitable rubber accelerator, in connection with the vulcanization of my products.

Although I have described the more significant and important methods of control, I wish to particularly point out that my method permits of many other methods of controlling the structure and the apparent density of my resulting product, by applying methods and principles well known in the technology of rubber, and my invention should accordingly not be limited strictly to the illustrations which I have given. Although I prefer to employ natural rubber latex stabilized by the addition of a small amount of ammonia as my raw material, my invention is not limited to the use of natural rubber latex, and may be applied equally well to artificial dispersions of rubber in aqueous dispersion media, and there may be admixed with either phase of the dispersoid other materials either liquid or solid, for the purpose of suitably modifying the character of either the coagulated rubber or the liquid which by its cyrstallization produces the desired structure in the coagulated product, and accordingly my invention should only be limited by the appended claims.

I claim:

1. The process which comprises cooling rubber latex until at least a part of the water crystallizes, and coagulating the resulting rubber network.

2. The process which comprises cooling an aqueous dispersion of rubber until ice crystals form in the aqueous medium, drying until the water is substantially removed, and vulcanizing the resulting porous product.

3. The process which comprises dispersing rubber in a liquid crystallizable medium, crystallizing the medium, coagulating the rubber, and vulcanizing the resulting coagulated rubber.

4. The process which comprises cooling natural rubber latex of controlled dilution until at least partial crystallization of the water has been brought about, and vulcanizing the resulting porous mass of rubber.

5. The process of forming articles of sponge rubber which comprises cooling rubber latex in a mold of the desired shape until the water freezes and coagulating the porous mass of rubber so produced.

6. The process of forming articles of sponge rubber which comprises cooling a mixture of a dispersion of rubber in an aqueous medium, adding particles of ice to the medium, while still liquid or semi-solid, and coagulating the resulting porous mass of rubber.

7. As a new composition of matter, sponge rubber having openings having the form of ice crystals.

8. As a new composition of matter, sponge rubber having openings pseudomorphic of ice particles.

In testimony whereof, I have hereunto subscribed my name this 15th day of January, 1926.

WALTER O. SNELLING.